United States Patent [19]
Norris

[11] Patent Number: 6,002,339
[45] Date of Patent: Dec. 14, 1999

[54] SEISMIC SYNCHRONIZATION SYSTEM

[75] Inventor: Michael W. Norris, Cypress, Tex.

[73] Assignee: Western Atlas International, Inc., Houston, Tex.

[21] Appl. No.: 09/016,049

[22] Filed: Jan. 30, 1998

[51] Int. Cl.$^6$ ..................................................... G08B 21/00
[52] U.S. Cl. ........................... 340/690; 340/540; 340/669; 367/14; 367/27; 367/55
[58] Field of Search ..................... 340/690, 540, 340/669, 309.15; 367/14, 27, 55

[56] References Cited

U.S. PATENT DOCUMENTS

| | | | |
|---|---|---|---|
| 4,635,746 | 1/1987 | Lin ............................................. | 367/55 |
| 4,800,538 | 1/1989 | Passmore et al. ......................... | 367/55 |
| 5,548,562 | 8/1996 | Helgerud et al. ......................... | 367/14 |
| 5,726,637 | 3/1998 | Miyahara et al. ....................... | 340/690 |

Primary Examiner—Glen Swann
Attorney, Agent, or Firm—Alan J. Atkinson

[57] ABSTRACT

A system for synchronizing a seismic system having multiple subsystems. A control system transmits a message to selected subsystems and an internal subsystem counter is zeroed to a selected epoch. Depending on the message or on an internal instruction code, each subsystem initiates an event or sequence of events synchronized to the selected epoch. The system is based on the relative occurrence of cyclic events and does not depend on the transmission of an absolute time signal. The system is self rectifying, reduces systemic errors, and reduces the data transmission required for system control and operation. The system permits autonomous, asynchronous operation by a subsystem without continuous control by a central controller as a function of time, and can interactively respond to events without intervention from the central controller.

18 Claims, 3 Drawing Sheets

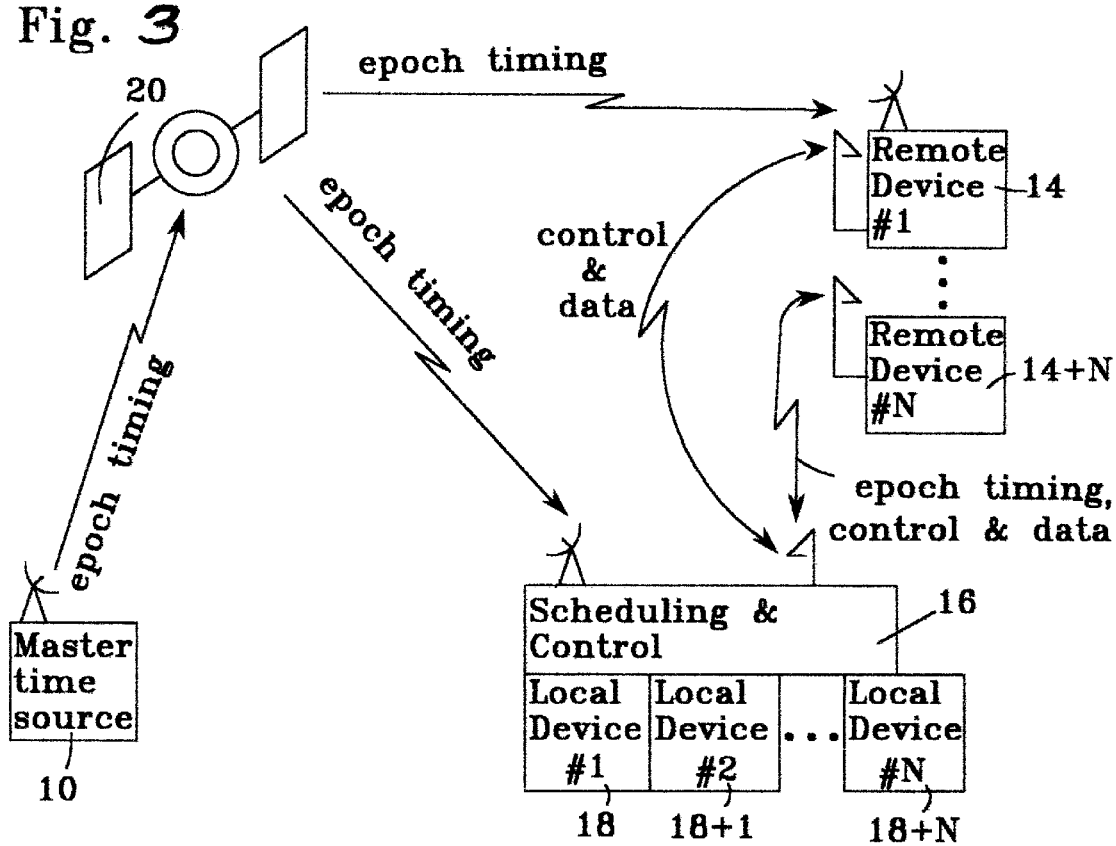

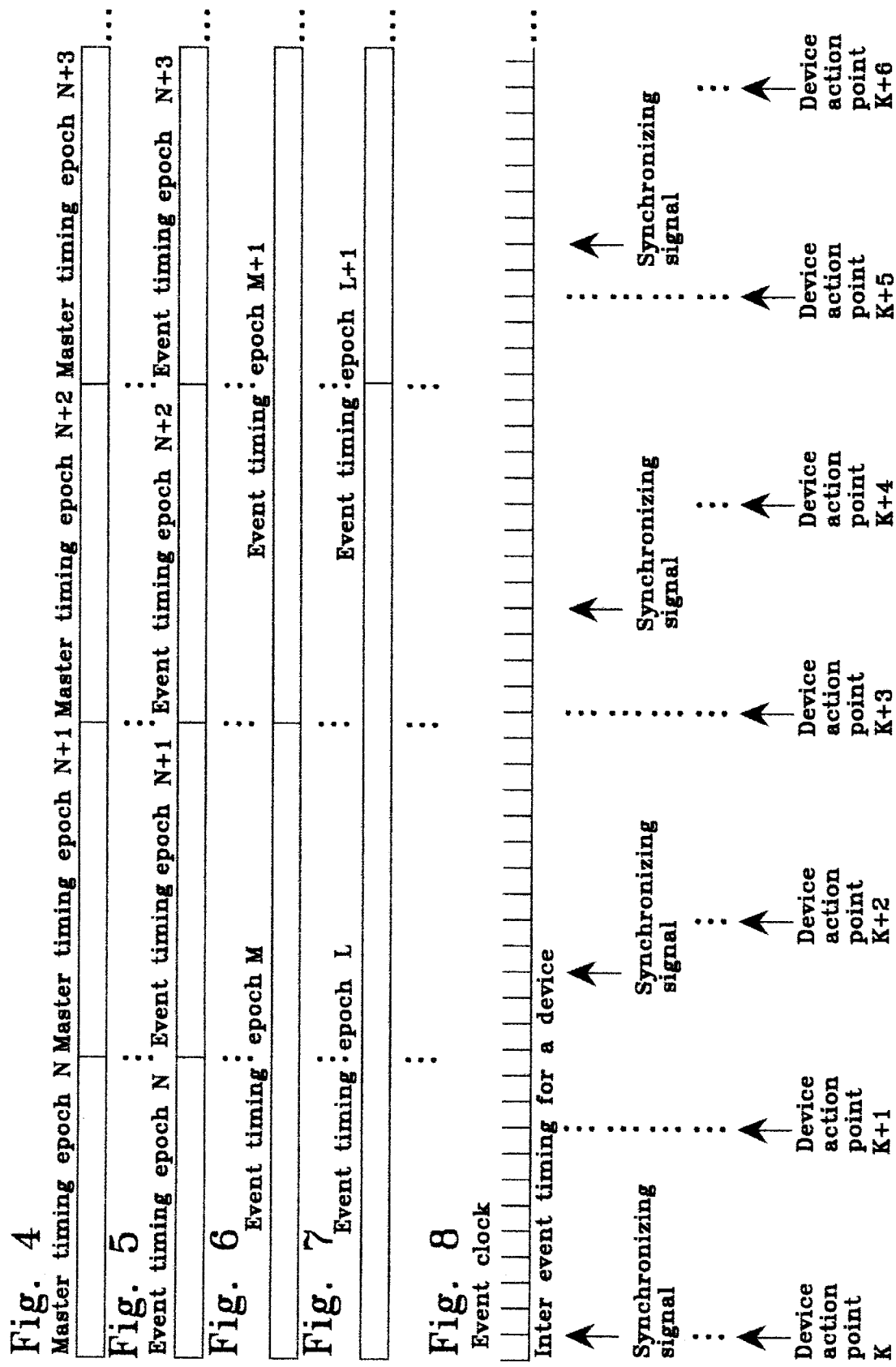

SEISMIC SYNCHRONIZATION SYSTEM

BACKGROUND OF THE INVENTION

The present invention relates to the field of seismic data acquisition operations. More particularly, the present invention relates to a unique system for synchronizing seismic subsystems through independent module timing.

Seismic data acquisition requires the coordination of numerous system components. In marine seismic operations, seismic vessels tow air guns through water to generate seismic energy sources. Acoustic waves from the air guns travel downwardly into the water and underlying geologic structures and are reflected by interfaces between the geologic structures. The reflected signal impulses return to the surface and are detected with sensors towed behind the seismic vessel.

Seismic signal processing requires time and position correlation between the seismic energy sources and the reflected signals. The length of time between energy sources and the reflected signals depends on factors such as the water depth, subsurface elevation of the reflective interface, and subsurface geology. Synchronization of the sources and reflected signals are necessary to the accurate evaluation of the data. Synchronization is necessary for the position of the individual components, the shot times, the shot recording times, and sampling times within the seismic data recording system. Additionally, synchronization is relevant to quality control procedures for testing the accuracy in the time domain and for testing event real times as compared with ideal times.

Numerous timing error sources affect the accuracy of the entire seismic survey system. The reduction of error sources is particularly important in three-dimensional seismic collection and in processing systems having data loads and error sources not found in conventional two-dimensional seismic technology. In conventional synchronization systems, these error sources are reduced by timing all events to a single clock which provides an absolute time reference.

In a marine seismic system, synchronization depends on the absolute time, vessel speed and subsystem position data. The seismic vessel navigation system determines the location where the air guns generate acoustic source energy. Each reflected pulse is detected by hydrophone data recording subsystems, and signals are transmitted through hard lines or through radio transmission. In large arrays, a central controller broadcasts an absolute time signal to each of the subsystems, and the acquired data is transmitted back to the central controller. Such continuous data transmission requires significant and generally continuous bandwidth capabilities.

Conventional event synchronization systems manage seismic event times as discrete events referenced to an absolute time scale. All events within the seismic survey system are actuated by trigger pulses from a navigation subsystem initiating pulse, and such operating systems reduce system synchronization errors by broadcasting an absolute time signal to internal clocks in each subsystem. The navigation system predicts the firing position for a source at a selected event time, the reference time is broadcast from a central controller to all survey subsystems before the selected event time, and the individual subsystems generate event pulses based on the pre-programmed times. In this system architecture, each subsystem depends upon the accuracy of the synchronized time standard. Accordingly, systematic errors in the transfer and triggering of the pulses causes delays and inaccuracies throughout the entire system.

Numerous techniques have been developed to address the synchronization and control of a seismic gathering system. U.S. Pat. No. 3,144,651 to Savit et al. (1964) disclosed an apparatus for recording seismic input signals. The recording cycle was commenced by a first event such as the rotation of a time recording drum. A second event corresponding to a defined "fiducial time (T=0)" generated a time break signal for disconnecting the time recording drum. In U.S. Pat. No. 3,704,444 to Schmit (1972), a program sequencer operated a timing clock, and U.S. Pat. No. 3,744,019 to Schmitt (1973) disclosed an absolute time clock for coordinating the field collection of seismic signals.

In U.S. Pat. No. 4,041,443 to Thigpen (1977), a clock engaged with a controller synchronized operations of seismic processing components, and the controller provided selected time zones for enabling different sample rates. In U.S. Pat. No. 4,042,906 to Ezell (1977), seismic data was transmitted in real time from individual slave stations to a master station having an absolute time clock oscillator and interval counter. The shot instant and the range of individual slave stations was transmitted to the master station, and a sequencing circuit was provided by clock pulse inputs from the clock oscillator.

In U.S. Pat. No. 4,092,629 to Siems et al. (1978), a repeater network transmitted a local self clocking phase-encoded data word through a data link to a central station. Subsequently, the repeater network received, regenerated and retransmitted self clocking phase-encoded data words from down-link transceiver units. A multiplexer initiated a scan cycle which was interruptable by resetting the multiplexer after signals from a preselected number of input channels was sampled. In U.S. Pat. No. 4,152,691 to Ward (1979), a master control and collation system provided a time-zero signal for correlating activation of a source and a time base for data acquisition units, and provided a time-check signal at the end of the acquisition unit recordings. In U.S. Pat. No. 4,224,474 to Savit (1980), a series of recording signals were initiated at desired intervals, and a predetermined number of recording channels were identified within a selected block. Consecutive recording cycles within a block were assigned unique corresponding addresses.

In U.S. Pat. No. 4,549,285 to Fleurance et al. (1985), data correlations were conducted in real time with a pilot signal. In U.S. Pat. No. 4,589,100 to Savit (1986), a central station included a master clock for firing a sound source. Remote seismic data recording units each included a separate clock for performing functions such as selectively deactivating the remote unit to conserve power. In U.S. Pat. No. 4,686,474 to Olsen et al. (1987), system synchronization was provided by a clock within a master computer which triggered local clocks for synchronizing geophysical and positioning data gathering. U.S. Pat. No. 5,058,080 to Siems et al. (1991) performed system synchronization by the continuous transmission of a command signal having a clocking signal.

U.S. Pat. No. 5,548,562 to Helgerud et al. (1996) describes a pulse synchronized system having a master controller for anticipating an event time and for generating a pulse or command at the correct time. A receiver obtained signals from a satellite navigation system such as Global Positioning System (GPS) based on an operable time standard such as Universal Time Coordinated (UTC). Such time standard was then supplied to selected subsystems in the seismic survey system, and the subsystems generated an event at the designated clock time. A pulse or command was required for each desired event, and the clock continuously provided signals to the system components.

As described above, conventional synchronization systems require a master clock which provides an absolute time standard for execution of subsystem events. Such systems also require continuous two-way data communication and coordination between the master controller and remote, individual subsystems. This two-way communication requirement consumes available communication links and requires accurate subsystem clocks correlated to the master clock.

The system errors and processing requirements of conventional systems demonstrate a need for an improved seismic synchronization system which can communicate more data within the available communications bandwidth. The system should be reliable and should efficiently transmit seismic event data within acceptable accuracy limits.

SUMMARY OF THE INVENTION

The present invention provides a system for synchronizing seismic event data. The system comprises a programmable subsystem for detecting the event and for executing a selected function following detection of the event, and a timer engaged with said subsystem and having a zero time setting. The timer is activatable in response to the event and is resettable to the zero time setting following completion of the event. In other embodiments of the invention, the system can include a second subsystem for detecting the event and for executing a selected function following detection of the event. In different embodiments of the invention, subsystems can be programmed for actvation to precede or to follow an event, or can be programmed to operate based on multiples or subdivided portions of an event.

The method of the invention comprises the steps of operating a subsystem to detect an event and to execute a selected function following detection of the event, of operating the subsystem to perform a selected function, of recording data regarding the selected function, and of preparing the subsystem to detect a second event.

BRIEF DESCRIPTION OF THE DRAWINGS

FIG. 3 illustrates satellite link transmission of epoch timing, control and data transmission.

FIG. 4 illustrates the base event timing for successive epochs.

FIG. 5 illustrates event timing tied to the base event timing.

FIG. 6 illustrates event timing having a period twice the base event timing.

FIG. 7 illustrates event timing having a period three times the base event timing.

FIG. 8 illustrates inter-event timing wherein synchronizing points and device action points can precede or follow base event timing epochs.

DESCRIPTION OF THE PREFERRED EMBODIMENTS

The present invention describes a unique system for synchronizing seismic related events and data related to such events. The invention is based on the recognition that seismic events are highly cyclic, related, and can operate within an allowable uncertainty range. For example, a typical seismic event comprises the firing of air guns in a marine environment to generate an acoustic energy signal. This signal is repeated approximately every ten seconds and initiates the activation of systems for recording data relevant to each acoustic energy signal. Because the relative position of the marine seismic system is constantly changing, each data set must be assigned to a base seismic event before data related to a seismic event can be processed, and before comparison data for different seismic events can be processed. Although conventional systems synchronize all events and data acquisition to an absolute time clock, the present invention discloses a unique system and technique for synchronizing seismic events and correlative data acquisition.

Figure 1:
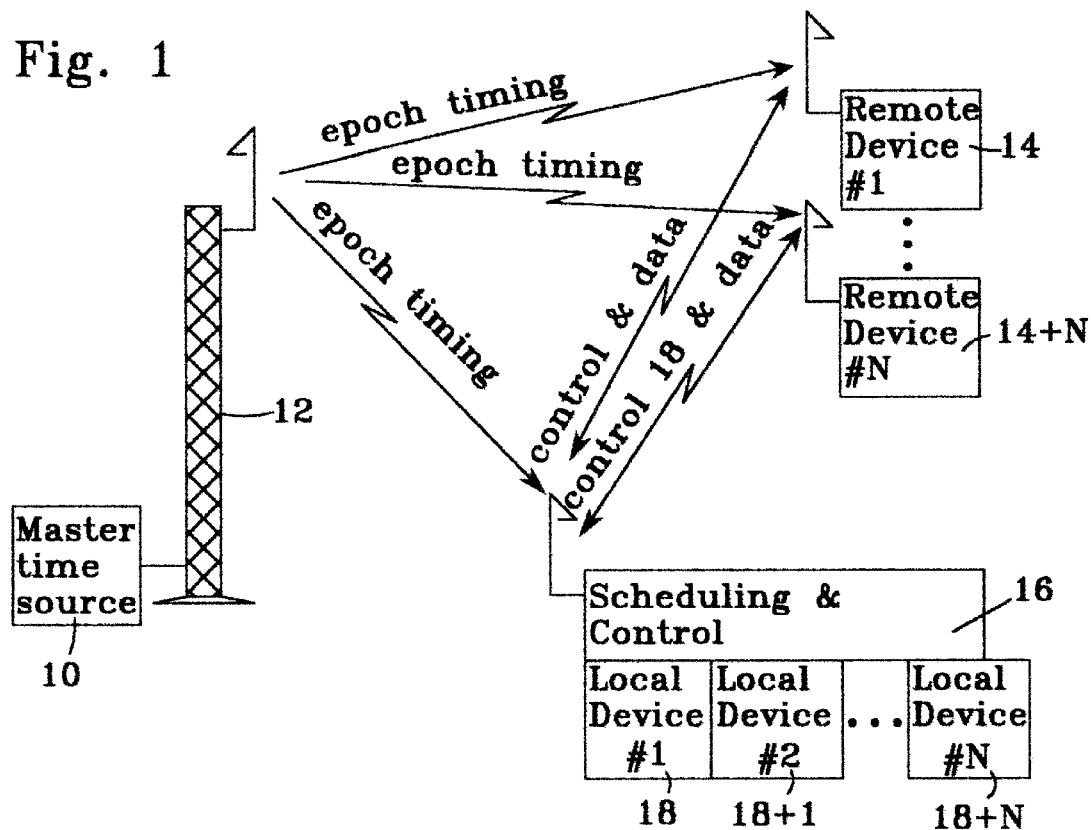
FIG. 1 illustrates one embodiment of the invention having local or near local master timing, with local control and scheduling.

FIG. 1 provides a schematic representation relevant to one embodiment of the invention. Master time source 10 is engaged with transmission tower 12 for wireless transmission of "epoch" (defined below) timing signals to remote devices identified as remote devices 14 through 14+N, and to controller 16. Devices 14 can comprise various devices such as source energy generators, data recorders, or other types of equipment. Controller 16 is engaged with one or more local devices identified as local devices 18 through 18+N. In various embodiments of the invention, local devices 18 can comprise hydrophones or geophones, transmitters, pressure sensors, location sensors, depth sensors, data processors, source energy generators, and other types of data generation, detection or transmission devices.

The invention is particularly suited to environments and applications having identifiable, repeatable time periods. The invention does not depend on an absolute time clock, but instead operates from a common time base associated with identifiable epochs. As used herein, the term "epoch" is defined as an instant in time selected as a reference. An epoch can have a defined duration, or there can be a defined time interval between epochs such as previously described for marine air guns.

One significant feature of the present invention is that the uncertainty for generating events and for detecting data can be based on a single epoch and the time period associated with a particular epoch. Once the common time base is known, a common least significant digit or value can be established for all substations. Such least significant digit becomes the allowable error for the event driven data, thereby permitting greater measurement flexibility than permitted in conventional systems. For example, the least significant time value can be determined by the minimum acceptable timing uncertainty for a major event such as the firing of a seismic energy source such as an air gun. If the uncertainty associated with air gun firing is 0.0005 seconds, then this uncertainty becomes the least significant value for all subsystems associated with events or data generation related to such air gun firing.

By limiting event and data acquisition uncertainty to a single epoch, overall uncertainty is significantly reduced because uncertainty does not accumulate over time. In conventional systems, measurements associated with a prior event impact all subsequent events and measurements, therefore requiring time adjustments to the absolute clock time for all subsequent events and measurements. The present invention prevents such error accumulation by zeroing each set of events and data acquisition procedures to a single epoch.

A master control such as controller 16 identifies which subsystems are required for a specific task and further identifies the required cycle rate for each subsystem such as device 18. When a series of action is required by a specific device 18, controller 16 sends a message to device 18. Such message gives the cyclic rate as a function of the least significant digit. After the message is received by device 18, and beginning at the next epoch or at a specified number of epochs later, device 18 zeros the time interval counter and begins performing the function at all time increments modulo with the cyclic rate.

Referring to FIG. 1, master time source 10 initiates the base epoch signal and transmits such signal to remote devices 14 and to controller 16. Following the initiation of the base epoch, controller 16 can execute a signal to each local device 18 to control the execution sequence for each local device 18. In different combinations, the execution sequences for each local device 18 can be based on the same schedule, can have longer or shorter periods, or can precede or operate after the epoch initiation as described more thoroughly below. Control and data transmission functions can be transmitted between controller 16 and remote devices 14.

In one embodiment of the invention, remote devices 14 can comprise seismic energy sources such as air guns set to detonate every ten seconds. The detonation of air guns can equal the base epoch and can control the operation of subsequent epochs. In this embodiment of the invention, local devices 18 can comprise geophones for detecting reflected seismic energy and for transmitting such data to a recorder. In this utilization of the invention, the air guns identified as remote devices 14 are actuated to generate a seismic energy event synonymous with the selected epoch, and the reflected data associated with such seismic energy event are identified with the selected epoch. Toward the conclusion of the ten second epoch, all system components are automatically zeroed and are readied to perform the respective functions during the time interval related to the next epoch.

Using this approach, each subsystem is started only once with a control sequence to initiate a sequence of events. The control system does not need to initiated each event as required by conventional systems. This approach is applicable to acquisition systems contained within a localized area and to acquisition systems distributed over a large areal extent. The master control and each subsystem can be interconnected with physical communication channels or with radio based telemetry communication links.

In one embodiment of the invention, a GPS derived clock can be used in the master control such as controller 16, and the GPS clock and all subsystems can be subdivided to a common time increment of 100 microseconds. In this example, the least significant time interval would be 100 microseconds. Epoch beginnings are set at one second increments, and a representative example of a subsystem for a gun control subsystem would set a cycling rate of 10 seconds. In this embodiment, the master control could send a message to the gun control subsystem to cycle at module 100,000. Because time represents a free running integer count having 100 microseconds as the least significant digit, the guns would be triggered every 10 seconds beginning after the next one second epoch.

If a similar message was sent to a related recording system such as device 18, the two systems would be synchronized to the related epoch and selected cycle rate. After the event, such synchronization would permit the gun system and the recording system to be tied together through the time and epoch counts.

Although the transmitted GPS time signal is an adequate source for derivation of the time base, any source having a clearly definable epoch and presenting a negligibly small time delay between subsystems can be used. As representative examples, the WWV timing signal transmitted by the United States government, or a locally generated time signal could be used for the time signal. The invention does not require a highly accurate time base because the time base is used to synchronize events related to discrete epochs and does not serve the conventional function of providing a master timing standard.

Because identifiable epochs provide synchronization points, the time base could include skips where a single event is missed. The system can be self-rectifying in different ways. For example, each epoch could be valued at an integer number of time increments. Subsystem counters can be advanced for an epoch number of counts every time an epoch is detected. Where an epoch is missed, the subsystem could assume that an epoch has occurred when an epoch worth of counts have occurred. This feature of the invention provides internal quality control capabilities not found in conventional systems.

Figure 2:
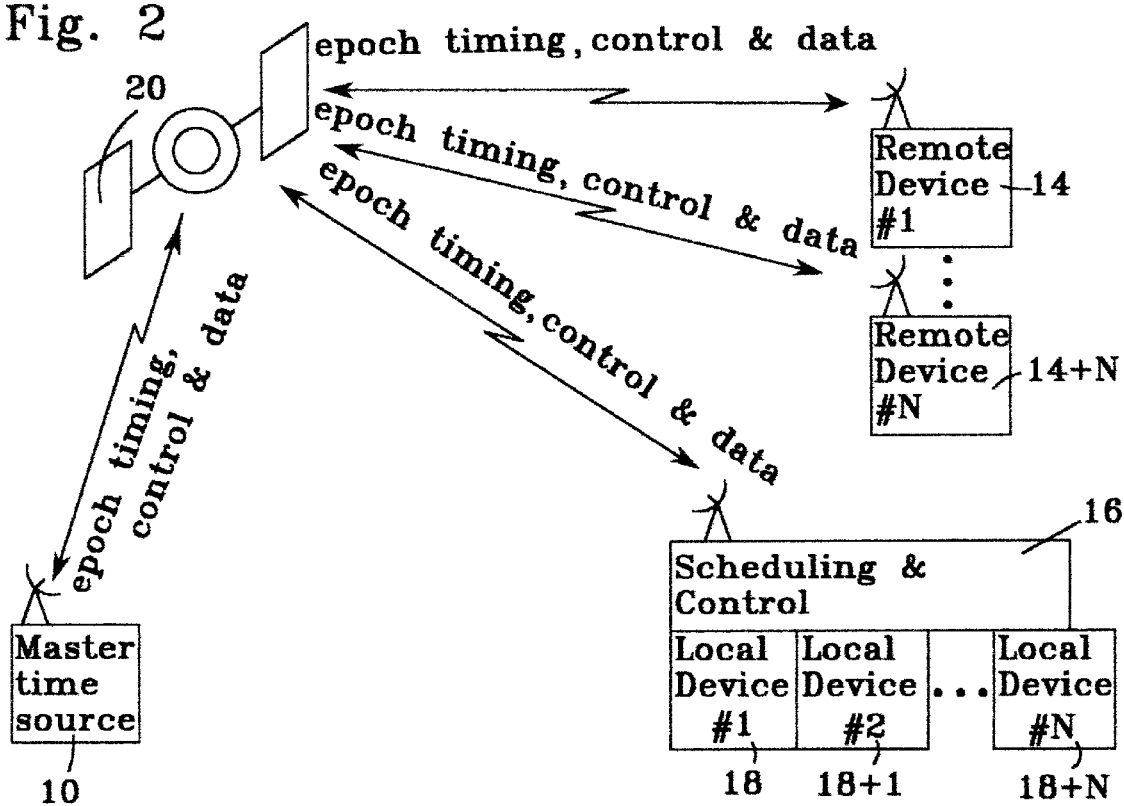
FIG. 2 illustrates remote master timing with local control and scheduling.

FIG. 2 illustrates another embodiment of the invention wherein the master timing can be initiated with master time source 10 and transmitted with satellite 20. Signal transmission from hundreds to thousands of miles is possible with this configuration. Satellite 20 can comprise a pass-through vehicle such as a communications satellite or can comprise a semi-autonomous device such as a GPS satellite. If satellite 20 comprised a GPS satellite, the master timing for the system is controlled and corrected by ground station such as master time source 10. This embodiment of the invention provides sequence initiation with master timing while providing local control and scheduling through remote devices 14 and controller 16.

FIG. 3 illustrates another embodiment of the invention wherein epoch timing is communicated between master time source 10 and satellite 20 as described for the embodiment in FIG. 2. Control and data information can be transmitted between remote device 14 and controller 16, and epoch timing, control and data signals can be transmitted between remote device 14 and controller 16. Although the epoch timing and control and data signal transmission is illustrated through the same satellite 20, each of these separate transmissions could be transported through independent transmission links.

In additional embodiments of the invention, a subsystem such as device 18 can broadcast messages acknowledging events generated and including the epoch count and any offset count associated with the events. The epoch offset account could be either negative or positive, accounting for subsystem actions occurring before or after an event. In addition to information generated from the module synchronization system, an acknowledgement message could include UTC time or time derived from a GPS clock. The acknowledgement message could include a secondary key to event timing. The initiation message could be expanded to include a number of events to be generated by a subsystem. Additionally, the least significant time value for subsystems can develop different accuracy levels within the event or data acquisition for an epoch. FIGS. 4–8 illustrate time bars showing the flexibility of the invention to cycles different than a base epoch rate. FIG. 4 illustrates the initiation point and duration for successive epochs shown as master timing Epoch N through master timing Epoch N+3 FIG. 5 illustrates event timing wherein each cycle precisely correlates with the master timing illustrated in FIG. 4. FIG. 6 illustrates event timing wherein each Epoch M has a duration twice the master timing shown in FIG. 4. FIG. 7 illustrates event timing wherein each Epoch L has a duration three times the master timing shown in FIG. 4.

These embodiments of the invention demonstrate how different subsystems can be initiated by the activation of a single master timing epoch, and do not require separate timing signals to continue subsequent operation. Consequently, the transmission of signals from a controller to the various subsystems is greatly reduced, thereby reducing signal transmission errors and opening up additional communication bandwidth in the data transmission systems. Similarly, the operation of subsystems for gathering data in intervals greater than the master timing interval reduces the number of signals transmitting data back to the central controller, thereby opening up additional communication bandwidth in the data transmission system. A subsystem such as device N can record and perform preliminary processing on data, and the processed data can be transmitted to a central recording source such as controller 16 after the occurrence of a selected number of epochs. This capability of the system permits data to be sequenced in transmission without generating additional errors in the data transmission system.

FIG. 8 illustrates another embodiment of the invention wherein inter-epoch events can be provided within the system. The epochs can be subdivided as illustrated to establish discretely timed events shorter than the epoch duration. Synchronization signals as illustrated can be set on a different cycle than the master timing epochs, and subsystem action points K through K+6 can be activated as illustrated. Differences in the sequence between the synchronization signals and the subsystem action points K et seq. can be used to correlate the event time, and to provide quality control in synchronizing events to selected epochs.

The present invention provides a unique synchronization system having exceptional application to controllers for complex events and data acquisition and transmission systems. The invention is applicable to systems having thousands of individual devices and subsystems, such as in land and marine-based seismic exploration systems. System timing flexibility permits sub-multiples and super-multiples of epochs to be addressed, thereby allowing for event and data collection timing before or after the time of a selected epoch. Significant errors in clock timing are eliminated because events and data collection are tied to the execution of a single epoch. Multiple events and data collection procedures can be started with a single signal, can be cycled over a selected interval or number of epochs, or can continue indefinitely until interrupted by a signal or outside event.

The invention permits totally autonomous operation of remote devices and subsystems, thereby eliminating errors caused in signal transmission, and providing overall system reliability in the collection, recording and processing of event data. In addition to the data and other information generated by a subsystem or device, an acknowledgement message could include UTC time or time from a GPS clock to provide secondary control over event timing error control. The initiation message transmitted to subsystems can include the number of events to be generated and the least significant time value for cases wherein the subsystems can generate multiple accuracy levels.

The system provided by the invention is self rectifying, reduces systemic errors, and reduces the data transmission required for system control and operation. The system permits autonomous, asynchronous operation by a subsystem without continuous control by a master control unit as a function of time. The system can interactively respond to events without intervention from the master controller, including start-up and closing of selected operations.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A system for synchronizing a response to a seismic event, comprising:

a programmable subsystem for detecting the event and for executing a selected function following detection of said event; and a timer engaged with said subsystem and having a zero time setting, wherein said timer is activatable in response to the event and is resettable to said zero time setting upon execution of said subsystem selected function.

2. A system as recited in claim 1, wherein said subsystem is programmable to execute multiple functions following detection of said event.

3. A system as recited in claim 1, wherein said timer is resettable to time zero following completion of said subsystem selected function.

4. A system as recited in claim 1, wherein said timer is resettable to time zero before said subsystem selected function is complete.

5. A system as recited in claim 1, wherein said timer is resettable to said zero time setting following detection of a second event.

6. A system as recited in claim 1, further comprising means for recording data regarding the selected function executed by said subsystem.

7. A system as recited in claim 6, further comprising a second programmable subsystem for detecting the event, wherein said second subsystem is capable of executing a selected function following detection of said event; wherein said data recording means is capable of communicating with said first subsystem and with said second subsystem to record data regarding the function executed by each subsystem.

8. A system as recited in claim 7, further comprising a processor engaged with said first and second subsystems for processing data regarding the function executed by each subsystem.

9. A system as recited in claim 8, wherein said processor is capable of correlating such processed data to a specific event.

10. A system for synchronizing collection of data regarding a seismic event, comprising:

a first subsystem for detecting the event, wherein said subsystem is capable of executing a first selected function following detection of said event;

a second subsystem for detecting the event, wherein said subsystem is capable of executing a second selected function following detection of said event; and timers engaged with each subsystem for initiating said selected functions following detection of the event at time zero, wherein said timers are resettable to time zero.

11. A system as recited in claim 10, wherein said timers are resettable to time zero upon execution of said first subsystem selected function.

12. A system as recited in claim 10, wherein said timers are resettable to time zero following the completion of a selected time interval.

13. A system as recited in claim 10, further comprising means for recording data regarding the selected functions executed by said first and second subsystems.

14. A system as recited in claim 13, wherein said data recording means comprises a single means communicating with said first substation and with said second substation.

15. A system as recited in claim 13, further comprising a processor engaged with said data recording means for processing said recorded data.

16. A method for operating a seismic data acquisition system having a programmable subsystem, comprising the steps of:

operating the subsystem from an initial state to detect an event, wherein said subsystem is preprogrammed to execute a selected function following said event detection;

operating said subsystem to perform said selected function following a selected time interval following detection of said event;

recording data regarding said selected function; and preparing said subsystem to detect a second event by returning said subsystem to said initial state.

17. A method for operating a seismic data acquisition system having a programmable subsystem, comprising the steps of:

operating the subsystem from an initial state to detect an event, wherein said subsystem is preprogrammed to execute a selected function following said event detection;

operating said subsystem to perform said selected function;

recording data regarding said selected function; and preparing said subsystem to detect a second event by returning said subsystem to said initial state, wherein the step of preparing said subsystem to detect a second event comprises the step of resetting a time clock to zero.

18. A method for operating a seismic data acquisition system having a programmable subsystem, comprising the steps of:

operating the subsystem from an initial state to detect an event, wherein said subsystem is preprogrammed to execute a selected function following said event detection;

operating said subsystem to perform said selected function;

recording data regarding said selected function;

preparing said subsystem to detect a second event by returning said subsystem to said initial state; and programming said subsystem to perform a selected function in response to cyclic detection of said events.

* * * * *